United States Patent [19]
Chujo et al.

[11] Patent Number: 5,218,601
[45] Date of Patent: Jun. 8, 1993

[54] METHOD FOR SEARCHING FOR ALTERNATE PATH IN COMMUNICATION NETWORK

[75] Inventors: Takafumi Chujo, Hachiouji; Hiroaki Komine, Yamato; Keiji Miyazaki; Takao Ogura, both of Kawasaki; Tetsuo Soejima, Tama, all of Japan

[73] Assignee: Fujitsu Limited, Kawasaki, Japan

[21] Appl. No.: 630,602

[22] Filed: Dec. 20, 1990

[30] Foreign Application Priority Data

Dec. 22, 1989 [JP] Japan .................................. 1-331219
Oct. 17, 1990 [JP] Japan .................................. 2-276150

[51] Int. Cl.$^5$ .............................................. H04J 3/14
[52] U.S. Cl. ........................................ 370/16; 370/13; 371/8.2; 371/11.1; 371/11.2
[58] Field of Search .................... 370/13, 16; 371/8.2, 371/11.1, 11.2

[56] References Cited

U.S. PATENT DOCUMENTS 4,953,162  8/1990  Lyons et al. ..................... 370/94.1
4,993,015  2/1991  Fite, Jr. ............................... 370/16

FOREIGN PATENT DOCUMENTS

85/02737  6/1985  PCT Int'l Appl. .
87/00374  1/1987  PCT Int'l Appl. .
2173977   9/1988  United Kingdom .

Primary Examiner—Douglas W. Olms
Assistant Examiner—Russell W. Blum
Attorney, Agent, or Firm—Staas & Halsey

[57] ABSTRACT

A method includes the steps of a failure which occurs in a node or link, and b) identifying at most N (N is an integer equal to or greater than 2) nodes contained in each path affected by the occurrence of the failure. Each path is connected to a sender node which detects the failure, information is transferred to the sender node via the N nodes, and the sender node serves as a start point of each alternate path which is to be established. The method also includes the step of c) broadcasting a restoration message to links which outgo from the sender node, where the restoration message has an identifier of the sender node and identifiers of the N nodes specified for each path affected by the occurrence of the failure. The identifiers of the N nodes specified for each path being candidate nodes of an end point of each alternate path. The method als includes a step of d) determining whether or not a node being considered is one of the candidate nodes, where the node which is one of the candidate nodes is a destination node. Further, the method includes the steps of e) passing the restoration message through a repeater node which is a node other than the candidate nodes, and f) determining a route via which the restoration message has been transferred to the destination node to be an alternate path connected between the sender node and the destination node.

24 Claims, 15 Drawing Sheets

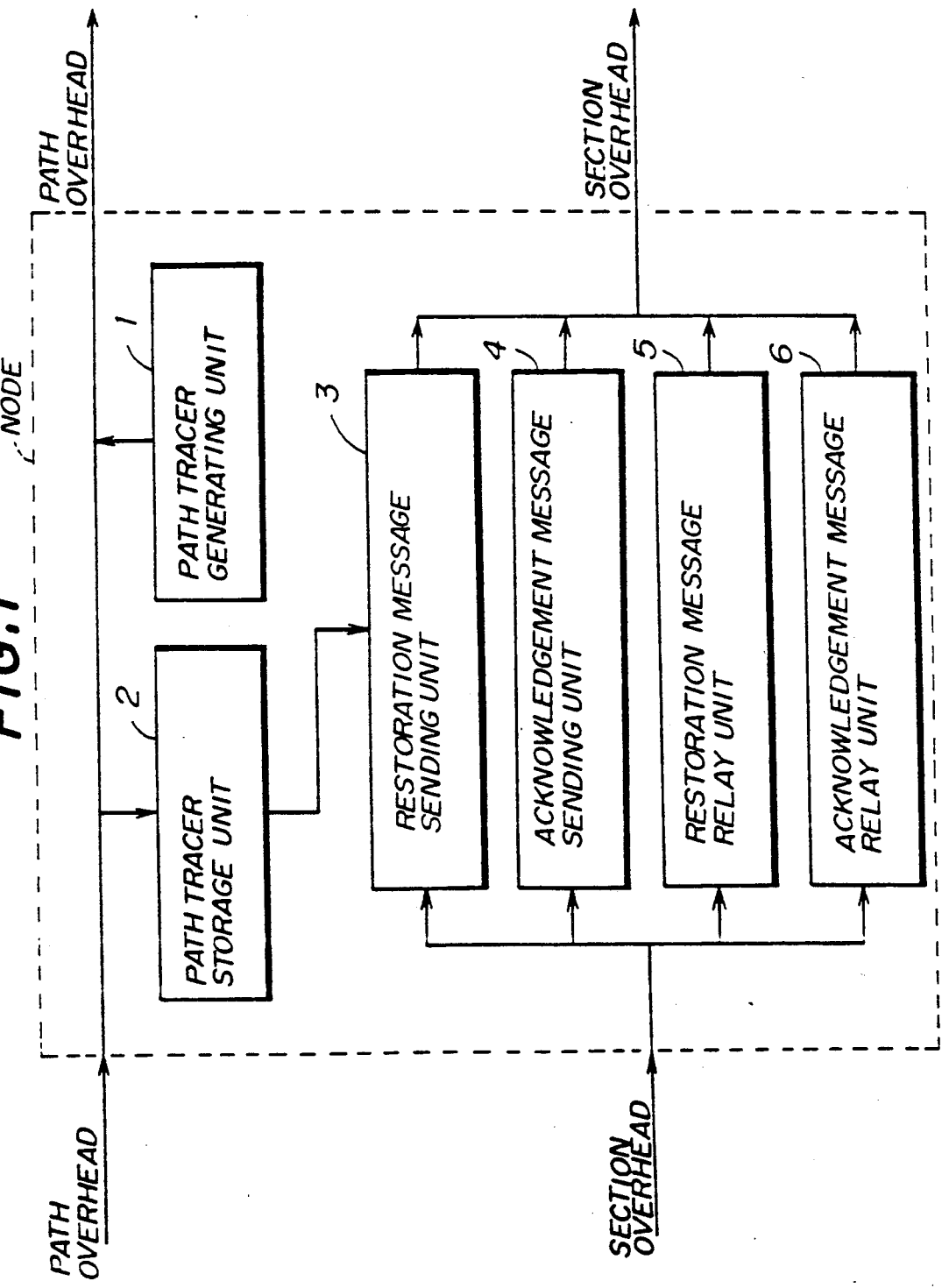

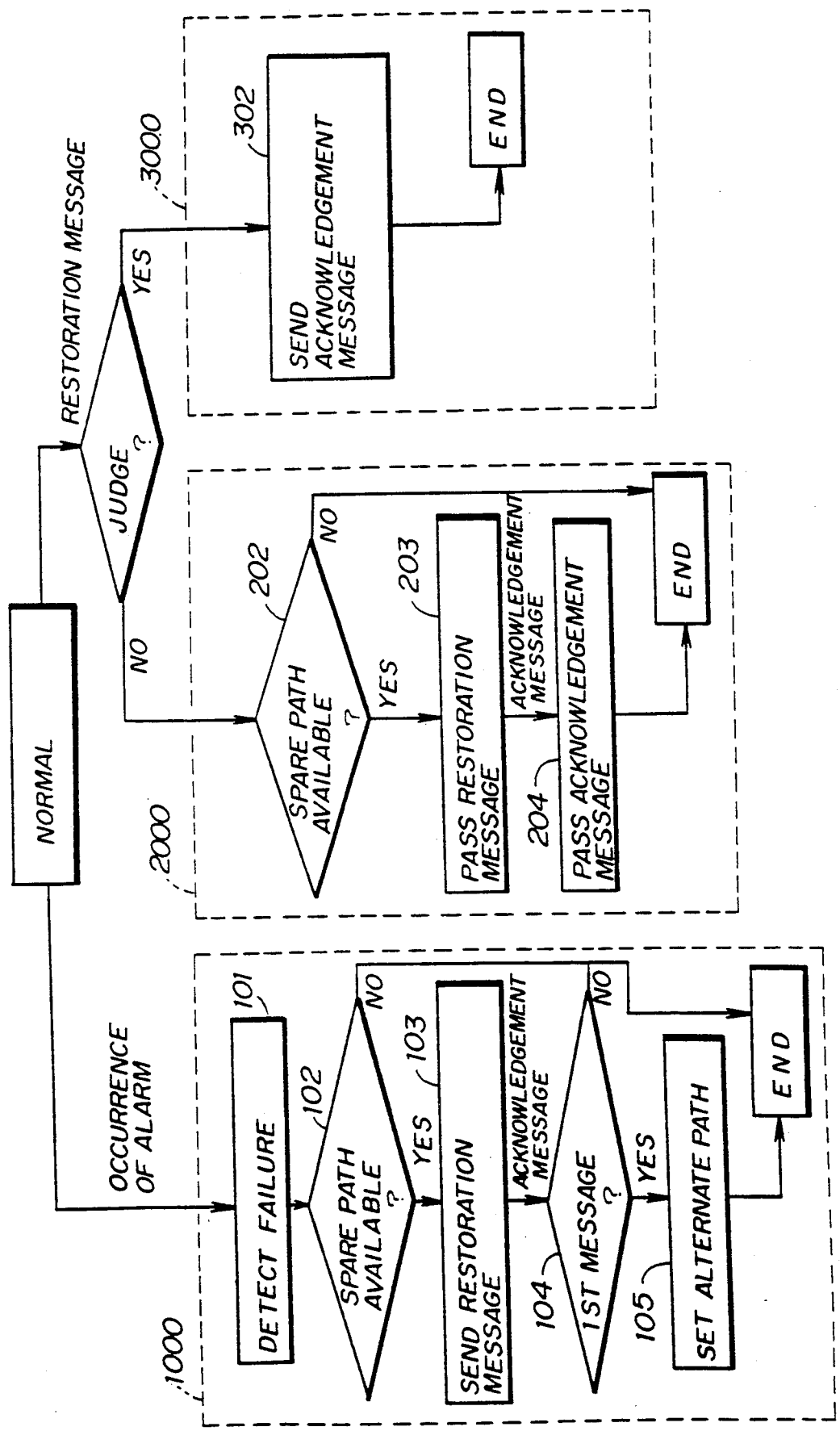

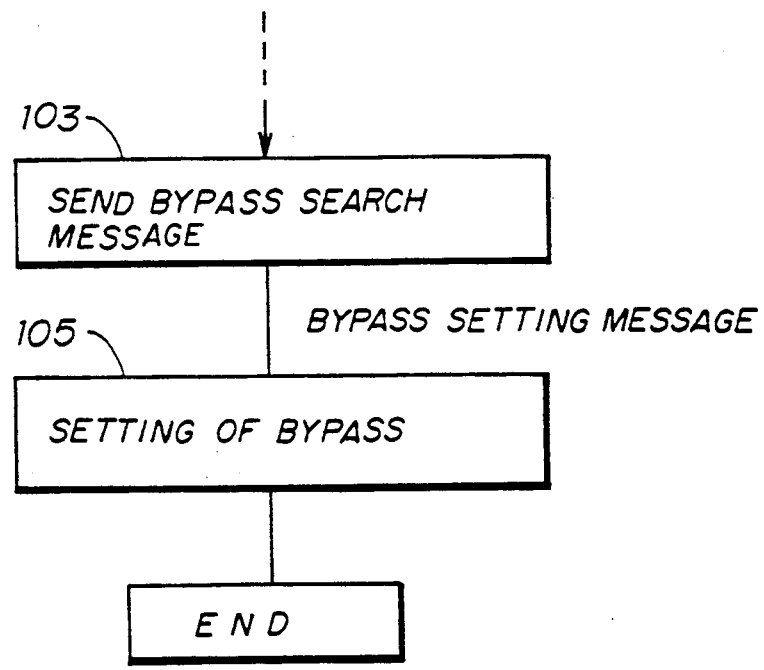

FIG.8A

| 1ST | 2ND | 3RD | 4TH | 5TH |
|---|---|---|---|---|
| NODE D | NODE C | NODE B, NODE X, NODE Y, | 4,2,1,1 | PATH1, PATH2, PATH3, PATH 4 |

FIG.8B

| | | | | |
|---|---|---|---|---|
| NODE D | NODE C | NODE B, NODE X, NODE Y | 0,2,1,1 | 0, PATH1, PATH2, PATH3, PATH4 |

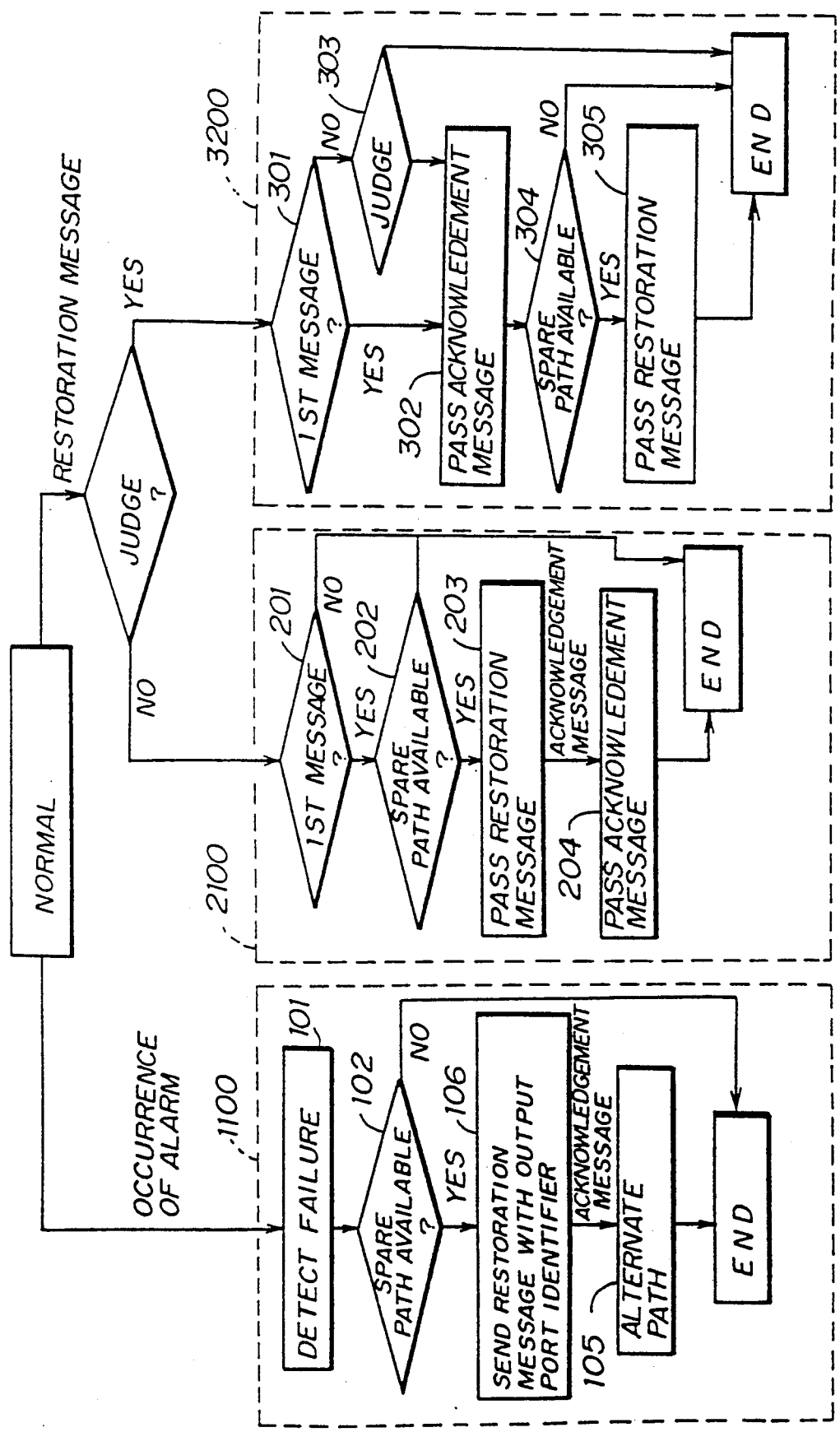

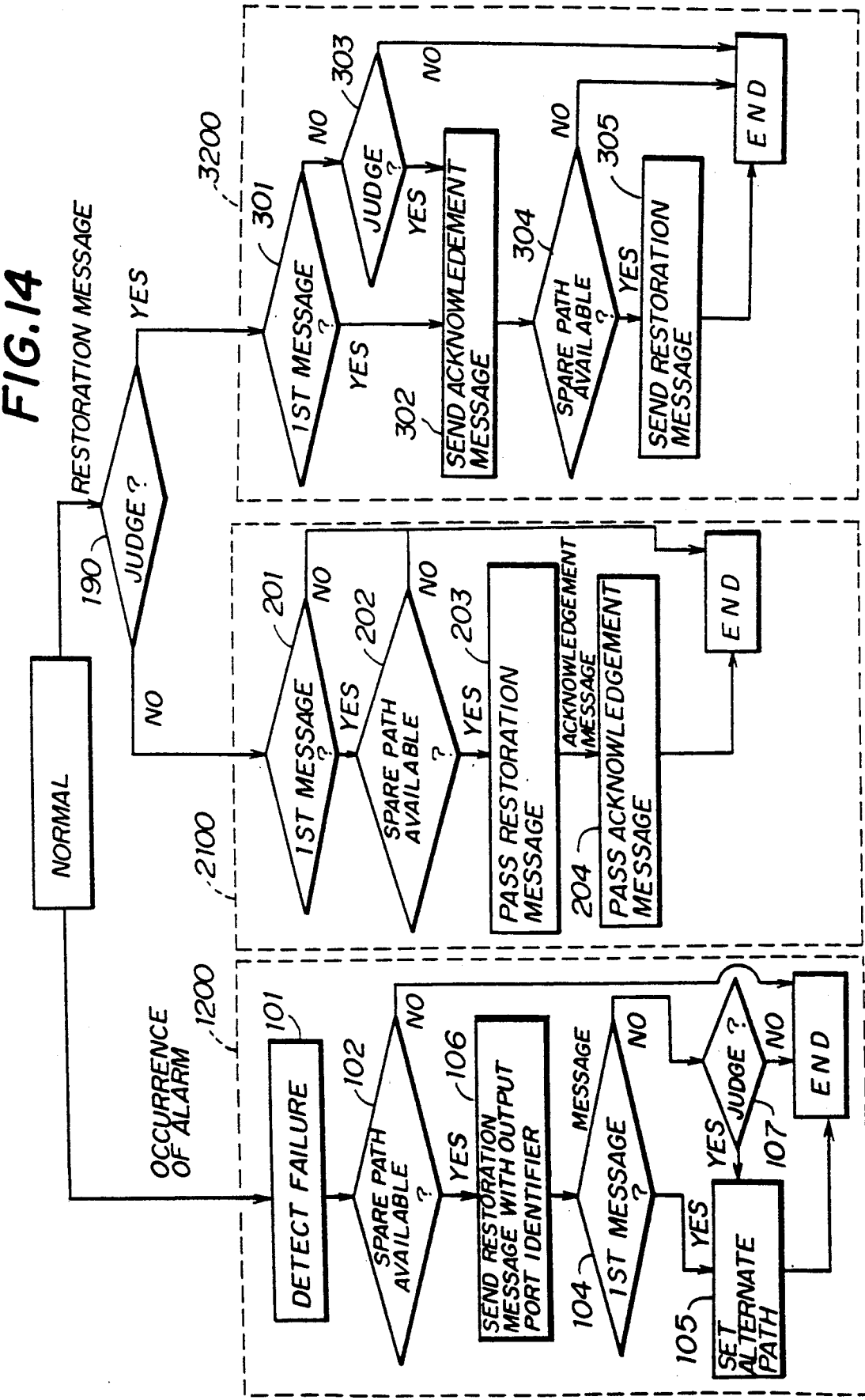

METHOD FOR SEARCHING FOR ALTERNATE PATH IN COMMUNICATION NETWORK

BACKGROUND OF THE INVENTION

The present invention generally relates to a communication network, and particularly to a method for searching for an alternate path in the communication network when a failure occurs in a node provided therein or a link coupling nodes. More particularly, the present invention is concerned with a method in which each node searches for alternate paths by itself by an improved flooding process.

There are known two different types of alternate path searching processes, one being a centralized control process and the other being a decentralized control process. The centralized control process uses a center station provided in a network. The center station supervises the states of lines. When the center station is informed of the occurrence of a failure from a node, the center station starts to search for alternate paths which do not pass through a failure link.

On the other hand, the decentralized control process uses a flooding procedure in which each node searches for one or more alternate paths by itself. In the flooding procedure, a node which detects a failure sends a message having a destination node address to all links extending from the above node without specifying a route. Each node which receives the message determines whether or not itself is indicated by the received message. Nodes which are not indicated by the message, that is, nodes other than the destination node, pass through the message to all links connected to these nodes. The above-mentioned procedure is repeatedly carried out until the message is received by the destination node. The above-mentioned decentralized control process is known as a routing process in a packet communication, and is highly reliable.

However, the centralized control process needs an increasingly larger amount of time to search for an alternate path as the size of the network increases. Further, the centralized control process needs the center station and cannot search for an alternate path when a failure occurs in the center station.

On the other hand, in the conventional decentralized control process, each node searches for an alternate path, assuming that a failure has occurred in a link. That is, even if a failure occurs in a node, the conventional decentralized control process assumes that the failure has occurred in a link. When a failure occurs in a node and the outputting of a signal stops, a node adjacent to the above node detects the interrupting of the signal supply via a link and concludes that a failure has occurred in the link. Thus, the conventional decentralized control process is not capable of determining whether the failure has occurred in a node or a link, and thus does not cope with a failure which occurs in a node.

SUMMARY OF THE INVENTION

It is a general object of the present invention to provide an improved method for searching for an alternate path, in which the above-mentioned disadvantages are eliminated.

A more specific object of the present invention is to provide a method for searching for an alternate path which is capable of handling a failure which occurs in a node.

The above-mentioned objects of the present invention are achieved by a method for searching for an alternate path in a communication network which has a plurality of nodes and a plurality of links which mutually connect adjacent nodes, information being transferred via a path which goes through the nodes, the method comprising the steps of:

a) detecting a failure which occurs in a node or link;

b) identifying at most N (N is an integer equal to or greater than 2) nodes contained in each path affected by the occurrence of the failure, each path being connected to a sender node which detects the failure, information being transferred to the sender node via the N nodes, and the sender node serving as a starting point of each alternate path which is to be established;

c) broadcasting a restoration message to links which outgo from the sender node, the restoration message having an identifier of the sender node and identifiers of the N nodes specified for each path affected by the occurrence of the failure, the identifiers of the N nodes specified for each path being candidate nodes of an end point of each alternate path;

d) determining whether or not a node being considered is one of the candidate nodes, the node which is one of the candidate nodes being a destination node;

e) passing the restoration message through a repeater node which is a node other than the candidate nodes; and f) determining a route via which the restoration message has been transferred to the destination node to be an alternate path connected between the sender node and the destination node.

BRIEF DESCRIPTION OF THE DRAWINGS

Other objects, features and advantages of the present invention will become more apparent from the following detailed description when read in conjunction with the accompanying drawings, in which:

FIG. 1 is a block diagram illustrating an outline of the present invention;

FIG. 7A is a flowchart illustrating the operation of the first embodiment of the present invention;

FIG. 7B is a flowchart illustrating the operation of a variation of the first embodiment of the present invention;

FIG. 8A is a diagram of a restoration message used in another variation of the first embodiment of the present invention;

FIG. 8B is a diagram of a restoration message used in a second preferred embodiment of the present invention;

FIG. 13 is a flowchart illustrating the operation of the third embodiment of the present invention; and FIG. 14 is a flowchart illustrating the operation of a variation of the third embodiment of the present invention.

DESCRIPTION OF THE PREFERRED EMBODIMENTS

Figures 2A, 2B, 2C:
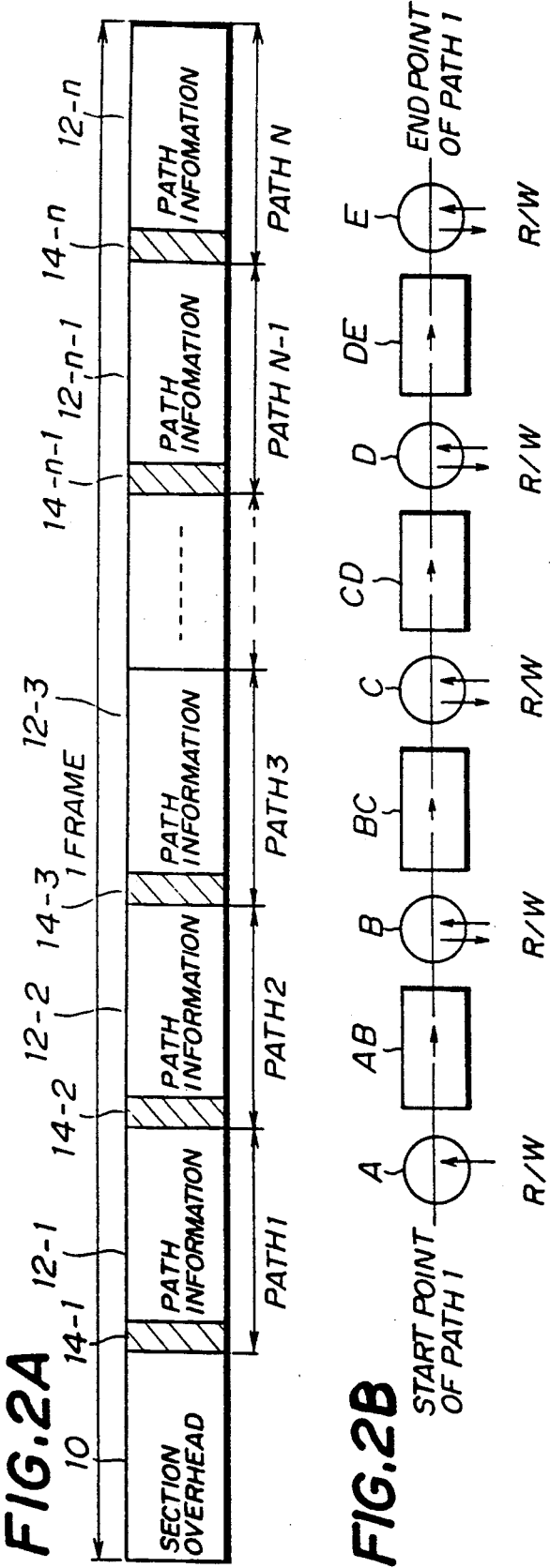
FIGS. 2A, 2B and 2C are diagrams showing path tracers used in the present invention.

Referring to FIG. 1, there is illustrated a node provided in a communication network in which a plurality of nodes are coupled to a plurality of links. The node shown in FIG. 1 is composed of a path tracer generating unit 1, a path tracer storage unit 2, a restoration message sending unit 3, an acknowledgement sending unit 4, a restoration message relay unit 5 and an acknowledgement message relay unit 6.

The path tracer generating unit 1 generates a path tracer for each path. The path tracer generated for the i-th path (i is an integer) indicates N nodes (N is an integer) via which the i-th path has gone before passing through the node being considered. Each node writes its own identifier into a path overhead area of transmission information transferred between the nodes. The path tracer storage unit 2 stores the received path tracer written into the path overhead section area for each of the paths. The restoration message sending unit 3 of a node which detects a failure broadcasts, to all output links extending therefrom, a restoration message having an identifier of each node indicated by the path tracer for a path affected by the occurrence of the failure. The identifier defines the node which detects the path failure as one end point of each alternate path and defines the N nodes as candidates of the other end points of these alternate paths. When the broadcasted restoration message indicates the node being considered, the acknowledgement message sending unit 4 thereof writes an acknowledgement message into a section overhead included in information to be transmitted and sends back the acknowledgement message to a reverse route of the path via which the restoration message has been transferred. The restoration message relay or repeater unit 5 of the node being considered broadcasts, to the section overheads of all the output links connected thereto, the restoration message related to the other nodes received via the section overheads of the input links. The aoknowledqement message relay or repeater unit 6 of the node being considered broadcasts the acknowledgement messages addressed to the other nodes via the section overheads of the input links to the section overheads of the output links corresponding to the paths designated by the restoration messages.

In the alternate path searching process based on the flooding procedure, each node searches for an alternate path by itself. In order to handle a node failure in the alternate path searching process, it is necessary to use information about the route of each path which shows which nodes each path affected by the occurrence of the node failure goes through. The aforementioned path tracer shows information about the route of each path. As has been described previously, the path tracer is generated for each path. Thus, the path tracer indicates nodes through which the corresponding path goes or extends. The path tracer is written into the path overhead area and then transferred. Each node stores the received path tracer written into the path overhead area. The number of nodes which are allowed to be written into the path tracer is limited to N in order to reduce the amount of information written into the overheads and each node.

In order to search for alternate paths, it is necessary to identify nodes which switch the links so that alternate paths are formed. As has been described previously, according to the conventional process, the end point of each alternate path is automatically defined as being the node which detects the link having a failure and the node located at the other end of the link. Thus, it is impossible to discriminate the node failure from the link failure.

According to a first embodiment of the present invention, the node which has detected a failure is defined as one end point of an alternate path, and N nodes through which a path affected by the failure goes, are defined as candidates for the other end point of the alternate path. It is possible to identify the above n nodes by means of the path tracers stored in the node which detects the failure. Then, the node which has detected the failure broadcasts the restoration message having the aforementioned node identifier which indicates itself (serving as the one end point) and the N candidate nodes to all the output links extending from the node which has detected the failure.

Each of the nodes which receive the restoration message determines whether or not it is indicated thereby, that is, whether or not it is one of the N candidate nodes. When the determination result is affirmative, each of the nodes sends back the acknowledgement message. It will be noted that a node having a failure cannot send back the acknowledgement message. Thus, it is possible to determine an alternate path which alternate paths the node having the failure on the basis of the sent-back acknowledgement messages.

FIGS. 2A, 2B and 2C illustrate the path tracer which is transferred together with information and stored in each node. More specifically, FIG. 2A illustrates a format of information transferred between nodes connected via a link. FIG. 2B illustrates a procedure in which the path tracer is transmitted via a path and stored in nodes. FIG. 2C illustrates examples of path tracers stored in each node.

As shown in FIG. 2A, one frame of information has a section overhead area 10, path information areas 12-1 - 12-n, and path overhead areas 14-1-14n provided respectively for the path information areas 12-1-12-n where n=N. The section overhead area 10 is used for transmitting control messages, such as the restoration message and the acknowledgement message.

In FIG. 2B, A through E denote nodes, and AB, BC, CD and DE denote links which mutually connect the adjacent nodes. In each of the nodes A through E, the path tracer is read from a corresponding one of the path overhead areas 14-1-14-n and stored therein. Then, an identifier of the node A is written into a corresponding one of the path overhead areas 14-1-14-n instead of the identifier of the oldest node therein. It is now assumed that FIG. 2B is related to path 1, and the identifier of the node A is written into the path overhead area 14-1. The node B reads out the content of the path overhead 14-1 related to the path 1 and stores it therein. A path tracer 50 which is related to the path 1 and stored in the node B is shown in FIG. 2C. As shown, the path tracer 50 includes the identifier of the node A. It will be noted that the path tracer 50 has a capacity for storing two identifiers (that is, N =2). This holds true for the other path tracers shown in FIG. 2C.

The node B writes its identifier into the path overhead area 14-1. Thus, the node C receives a path tracer 51 shown in FIG. 2C and stores it therein. The path tracer 51 includes the identifiers of the nodes A and B. It will be noted that the identifier of the node located on the right side of the path tracer 51 indicates the node B adjacent to the node C on the upstream side. Then, the node C writes its identifier into the path tracer area 14-1. In this case, since N =2, the oldest identifier, that is, the identifier of the node A is omitted, and instead the identifier of the node C is written into the path overhead area 14-1 and transferred to the node D.

The node D receives a path tracer 52 shown in FIG. 2C and stores it therein. Then, the node D omits the identifier of the node B, and instead writes its own identifier into the path overhead area 14-1. Then, the node D sends a path tracer 53 shown in FIG. 2C to the node E.

Figure 3:
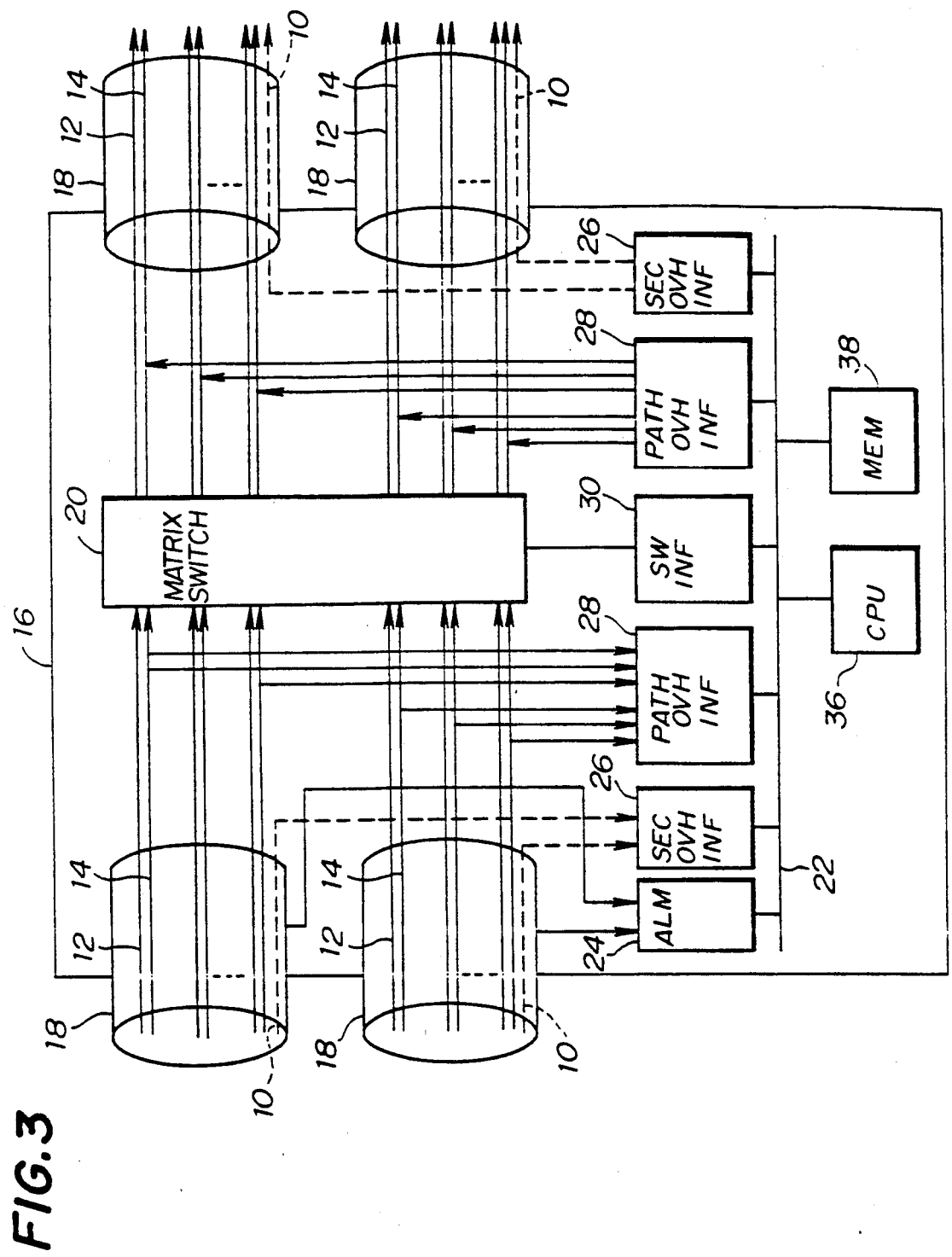
FIG. 3 is a block diagram of a node according to a first preferred embodiment of the present invention.

Referring to FIG. 3, the structure of each node 16 is illustrated. Links 18 are connected to the node 16. More specifically, two links 18 on the left side of the node 16 are input links, and two links 18 on the right side thereof are output links. Path information in the path information areas 12-1-12-n are transferred via the links 18, as indicated by thick solid lines. Information in the path overhead areas 14-1-14-n is transferred via the links, as indicated by thin solid lines. Information in the section overhead area 10 is transferred via the links 18, as indicated by broken lines.

The node 16 has a matrix switch 20, which switches connections between incoming path information 12 and path overheads 14-1-14-n and outgoing path information 12 and path overheads 14-1-14-n. An alarm generating circuit (ALM) 24 generates an alarm signal when it detects that the inputting of signals via the links 18 has stopped. A section overhead interface (SEC OVH INF) 26 transfers the section overhead 10 between the links 18 and a central processing unit 36 (hereafter simply referred to as a CPU). A path overhead interface (PATH OVH INF) 28 transfers the path overheads 14 between the links 18 and the CPU 36. A matrix switch interface (SW INF) 30 establishes an interface between the matrix switch 20 and the CPU 36. A bus 22 mutually connects the alarm generating circuit 24, the section overhead interface 28, the path overhead interface 26 and the CPU 36. The CPU 36 controls the entire operation of the node 16. A memory (MEM) 38 connected to the bus 22 stores a variety of information, such as the aforementioned path tracers.

Figure 4:
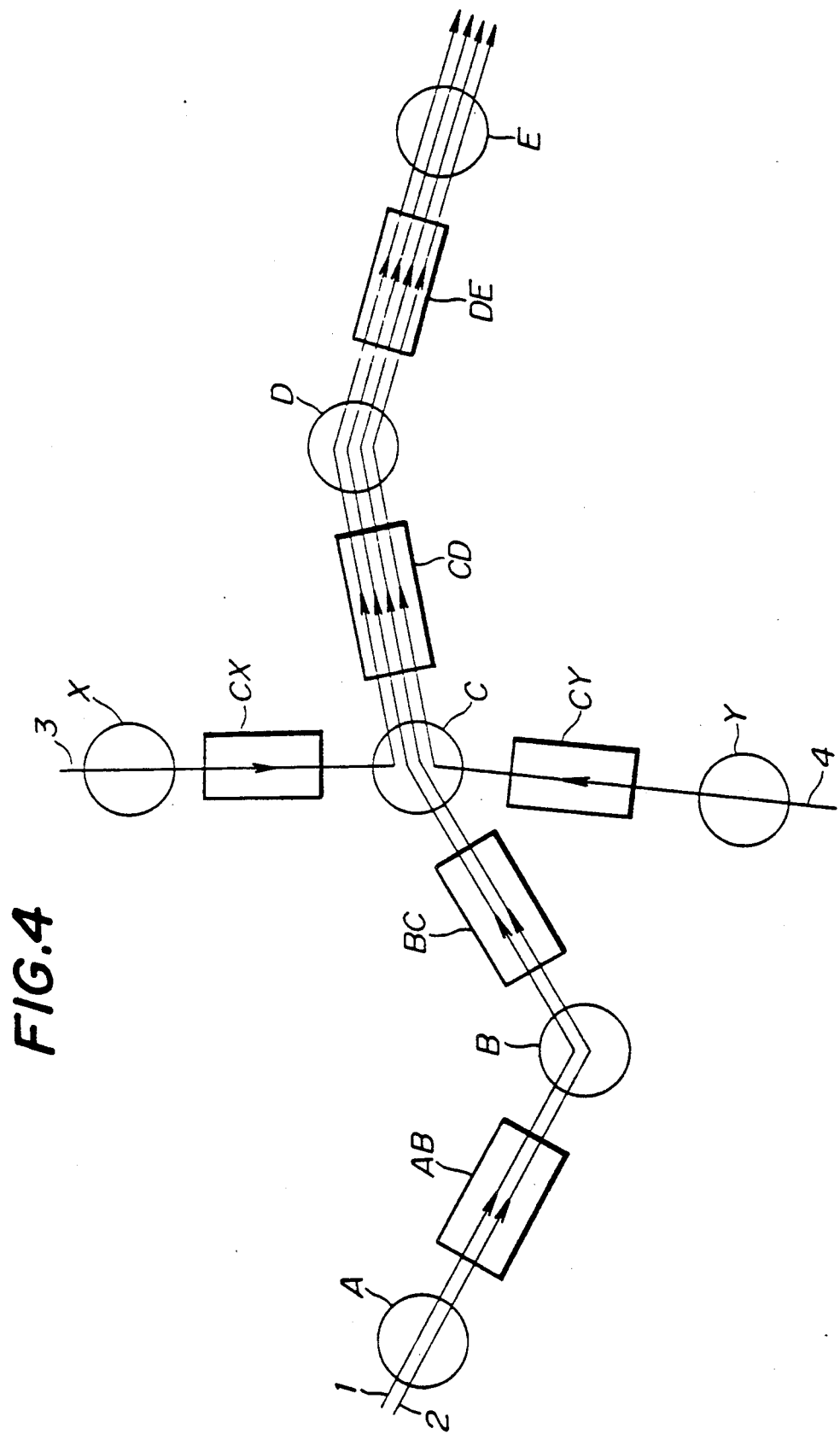
FIG. 4 is a block diagram of a communication network.

Referring to FIG. 4, there is illustrated a communication network including nodes A, B, C, D, E, X and Y, and links AB, BC, CD, DE, CX and CY connecting adjacent nodes. Four paths 1, 2, 3 and 4 are now formed in the communication network. It will be noted that the nodes A-E, X and Y are further connected by links (not shown) or combinations of links and nodes, and alternate paths are formed by using some of these links and/or combinations when a failure occurs in a node or link. Further, the communication network has reverse links (not shown) which extend in the direction opposite to that of the above links.

Figure 5:
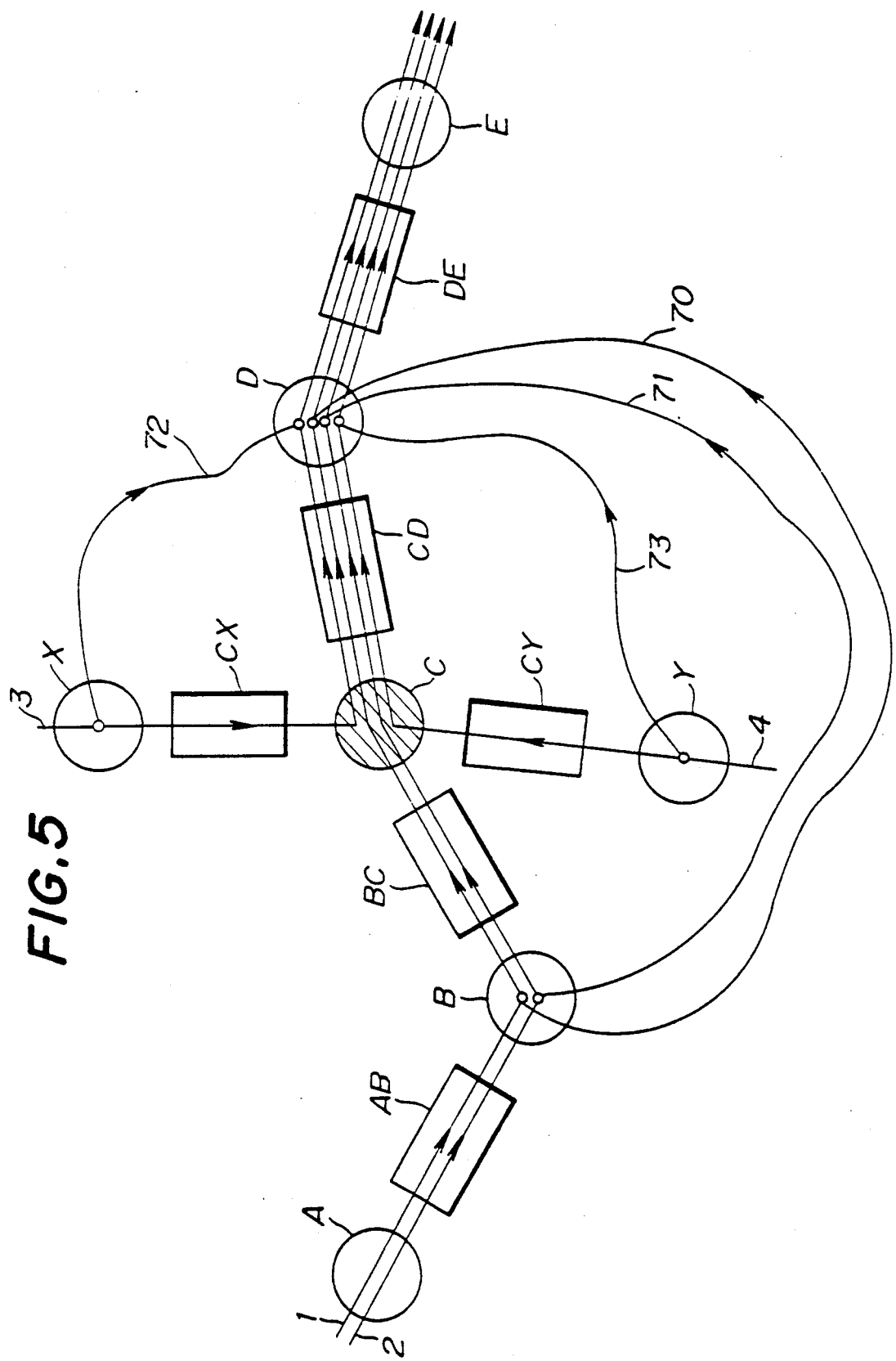
FIG. 5 is a block diagram illustrating how alternate paths are established according to the first embodiment of the present invention.

When no failure occurs in the communication network, the paths 1-4 go through the following nodes.
Path 1: node B—node C—node D
Path 2: node B—node C—node D
Path 3: node X—node C—node D
Path 4: node Y—node C—node D As shown in FIG. 5, it is now assumed that a failure has occurred in the node C, and the node D adjacent to the node C detects the fact that the inputting of signals via the link CD has stopped, and generates the alarm signal. The CPU 36 (FIG. 3) of the node D starts to execute an alternate path search process, and searches for an alternate path as follows.

First, the node D searches the paths of the link CD extending from the node C in which the failure has occurred, and identifies paths affected by the failure in the node C. In the case shown in FIG. 5, the paths 1-4 are affected by the failure in the node C.

Second, the path tracers which are respectively related to the paths 1-4 and stored in the node D are accessed and classified into groups so that identical path tracers are classified into an identical group. Then, the number of paths in each of the groups is counted. In the case shown in FIG. 5, the path tracers related to the paths 1-4 are classified into three groups as follows:
Group 1 (node C—node B): 2
Group 2 (node C—node X): 1
Group 3 (node C—node Y): 1
where each numeral on the right side indicates the number of paths included in the corresponding group.

Third, the node D generates a restoration message in which the node D is defined as the starting point of an alternate path, and the nodes contained in the path tracers are defined as candidate nodes of the end point of the alternate path. Then, the node D outputs the restoration message for each group to all the output links 18 connected to the node D by using the section overhead areas 10 of the output links. Each node always retrieves spare paths and stores information about the spare paths therein. More specifically, the following information is written into the restoration message.

1) An identifier (ID) of the node which sends out the restoration message.

2) An identifier (ID) of the first node (immediately previous node) written into the path tracers (which are candidate nodes of the end point of the alternate path for the group being considered).

3) An identifier (ID) of the second node (the oldest node) written into the path tracers (which are also candidate nodes of the end point of the alternate path for the group being considered).

4) Number of paths required to be bypassed (that is, the number of alternate paths required).

5) Identifiers of the paths required to be bypassed. For example, the information related to group 1 is as follows.
1) Node D
2) Node C
3) Node B
4) 2
5) Path 1, path 2.

Figure 6:
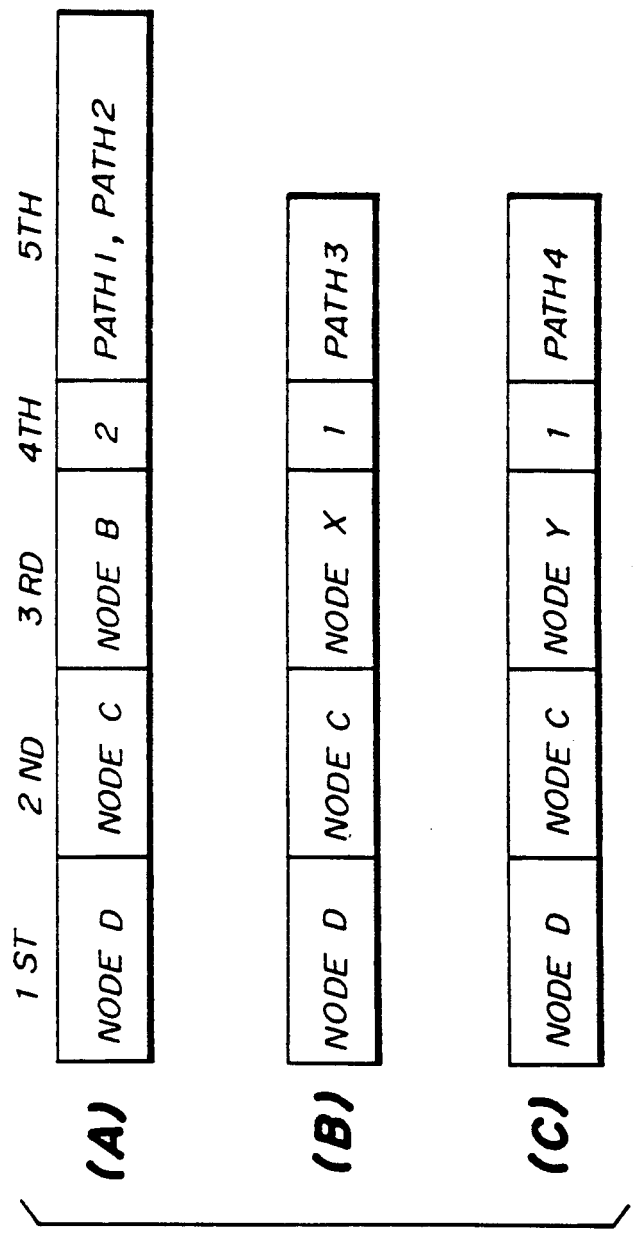
FIGS. 6A–6C are diagrams illustrating restoration messages generated respectively for groups of paths.

FIG. 6-(A) illustrates the restoration message related to the group 1. The restoration message has first through fifth fields, which have information about the above items 1) through 5), respectively. FIG. 6-(B) illustrates a restoration related to the group 2, and FIG. 6-(C) illustrates a restoration message related to group 3. The acknowledgement messages generated respectively for the groups 1, 2 and 3 are sent to all the output links extending from the node D.

Fourth, each node which has received the restoration message reads portions (fields) in the section overhead area 10 related to the above items 2) and 3), and determines whether or not it is one of the candidate nodes indicated by the above items 2) and 3). If a node determines that it is not any of the candidate nodes, it sends out the received restoration message to all its output links, each having a spare link. On the other hand, if each node determines that it is one of the candidate nodes of the end point of the alternate path, this node sends back the restoration message via the reverse route.

In the above-mentioned way, the acknowledgement messages are sent back to the node D. Then, the node D identifies, for each of the groups, the route via which the corresponding acknowledgement message first reached the node D, and determines the identified route to be an alternate path. Then, the node D sends a matrix switching message to the nodes in the route, and controls the matrix switch 20 (FIG. 3) so that the alternate path is formed.

The group 1 has the nodes C and B as the candidate nodes of the end point of the alternate path. However, the node C has the failure, and thus does not send back the acknowledgement message. Hence, only the node B sends back the acknowledgement message. As a result, the node D determines the node B to be the end point of the alternate path. According to the first embodiment of the present invention, it is possible to determine the end points of the alternate paths and search for the alternate path route at the same time.

In the case shown in FIG. 5, two paths 70 and 1 between the nodes B and D are determined to be the alternate paths of the group 1 since two alternate paths are requested. Similarly, a path 72 between the nodes X and D is determined to be an alternate path of the group 2, and a path between the nodes Y and D is determined to be an alternate path of the group 3.

Referring to FIG. 7A, there is illustrated the procedures 1000, 2000 and 3000 which realize the above-mentioned alternate path route setting process. The procedure 1000 is executed by the node which has detected a failure (node D in the above-mentioned example), and the procedure 2000 is executed by each node which is not specified by the restoration message generated for each of the groups. The procedure 300 is executed by each node which is specified by the restoration message generated for each of the groups.

The node D detects a failure and paths affected by the failure at step 101. Further, at step 101, the node D classifies the path tracers related to the paths affected by the failure into groups. At step 102, the node D determines whether or not spare paths are available in its output links. When the result at step 102 is NO, the node D ends the procedure 1000. On the other hand, when the result at step 102 is YES, at step 103, the node D outputs the restoration messages generated for the respective groups to all the spare paths of the output links. At step 104, the node D receives the acknowledgement message and determines whether or not each received acknowledgement message which is related to one of the groups is the first received message for this group. When the result at step 104 is NO, the node D ends the procedure 1000. On the other hand, when the result at step 104 is YES, the node D determines the route via which the acknowledgement message has been transferred to be an alternate path for the group being processed. At step 105, the node D outputs the matrix switching message, so that the alternate path is established.

It should be noted that the procedure of step 104 is directed to selecting some of the acknowledgement messages and actually setting the alternate paths corresponding to only the selected acknowledgement messages in order to prevent congestion caused by the acknowledgement messages and reduce the time necessary to establish alternate paths. Alternatively, as shown in FIG. 7B, it is possible to omit step 104 in principle. In the alternative, the alternate paths related to all the received acknowledgement messages are established.

Each node not indicated by one of the restoration messages sent at step 103 executes the procedure 2000 (step 190). Hereinafter, each above-mentioned node is referred to as a repeater node. At step 202, each repeater node determines whether or not spare paths are available in the output links connected thereto. When the result at step 202 is NO, each repeater node ends the procedure 2000. On the other hand, when the result at step 202 is YES, each repeater node sends out the received acknowledgement message to all the paths available in the output links.

Each node identified by one of the restoration messages executes the procedure 3000. Hereinafter, each above node is referred to as a destination node. At step 302, each destination node sends back the acknowledgement message in the reverse direction. Each repeater node receives the acknowledgement message from the destination node and sends it out at step 204.

A first variation of the above-mentioned first embodiment of the present invention will be described below. In the first embodiment of the present invention, the node D which has detected a failure receives the acknowledgement message and outputs the matrix switching message in order to establish the alternate path route. Instead of this procedure, it is possible to establish the alternate path route without sending out the matrix switching message. When the restoration message sent out by the node D passes through a node being considered, this node stores information indicating which node sent out the restoration message as well as information indicating toward which nodes the node sent out the restoration message. When the acknowledgement message is sent back by the node which is the end point of the alternate path, the node being considered sends the acknowledgement message in the reverse direction by using the information obtained from the restoration message. At the same time, the node being considered controls the matrix switch (cross connect switch) 20 so that it is fixed to the route in the reverse direction. The above procedure is carried out for each node, so that the alternate path is established between the start point and end point of the alternate path.

A second variation of the first embodiment of the present invention will be described below. The aforementioned alternate path search procedure generates the restoration messages for the respective groups. Alternatively, it is possible to generate a single acknowledgement message in common for all the groups. FIG. 8A illustrates a format of such a single acknowledgement message related to the case shown in FIG. 4. The following information is written into the single restoration message.

1) An identifier (ID) of the node which sends out the restoration message.

2) Identifiers (ID) of the first nodes (immediately previous nodes) written into the path tracers (which are candidate nodes of the end points of the alternate paths for the respective groups).

3) Identifiers (ID) of the second nodes (the oldest nodes) written into the path tracers (which are also candidate nodes of the end points of the alternate paths for the respective groups).

4) Number of paths required to be bypassed with respect to each of the nodes indicated by the above 2) and 3).

5) Identifiers of the paths required to be bypassed. The single restoration message related to the case shown in FIG. 4 is as follows:
1) Node D
2) Node C
3) Node B, node X, node Y
4) 4 (node C), 2 (node B), 1 (node X), 1 (node Y)
5) Path 1, path 2, path 3, path 4.

FIG. 8A shows the format of the above restoration message, which has first through fifth fields which store information about items the above 1) through 5), respectively.

At step 103 shown in FIG. 7, the node D outputs the above single restoration message to all the paths available in its output links. The other procedures which are carried out when the single restoration message is used are the same as those shown in FIG. 7.

Figure 9:
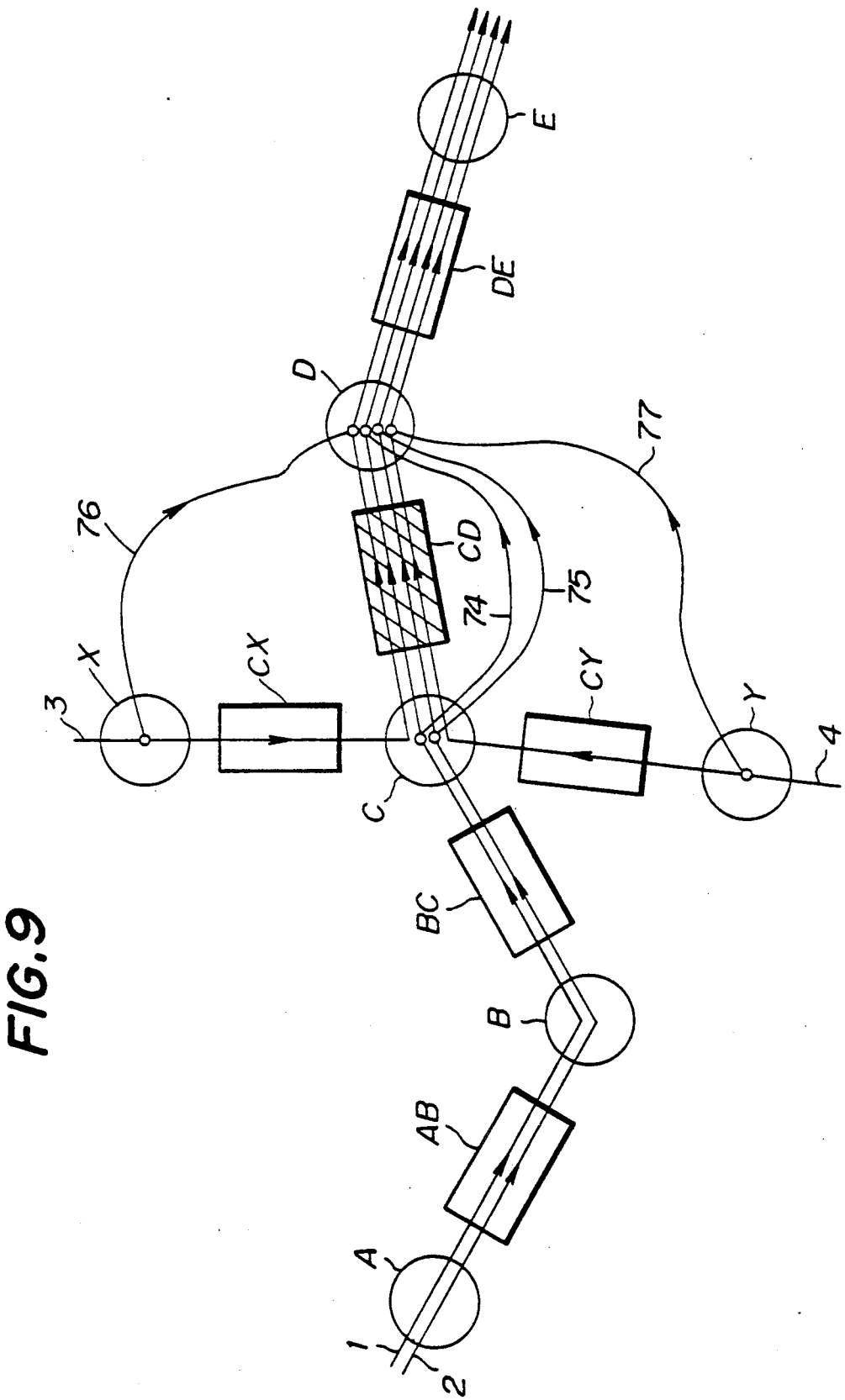
FIG. 9 is a block diagram showing how alternate paths are established according to the second embodiment of the present invention.

FIG. 9 shows a case where a failure has occurred in the link CD. In this case, the node D detects this failure. At this time, the node D cannot judge whether or not the failure occurred in the node C or the link CD. The alternate path search procedure is carried out in the aforementioned way. In the base shown in FIG. 9, it will be noted that the node C can send back the acknowledgement message to the node D. Thus, regarding the group 1, the acknowledgement message from the node C and the acknowledgement message from the node B conflict with each other. If the acknowledgement message from the node C is received by the node D in advance of that from the node B, the alternate paths 74 and 75 are established between the node C and node D. Regarding the groups 2 and 3, if the acknowledgement messages from the nodes X and Y are received by the node D in advance of the message from the node C, alternate paths 76 and 77 are respectively established between the node X and the node C and between the node Y and the node C.

A description will now be given of a second preferred embodiment of the present invention. According to the first embodiment and its variations, the alternate paths are not determined until the restoration messages are sent out by the node D and the acknowledgement messages are sent back to the node D. Further, there is a possibility that a plurality of acknowledgement messages will be returned from a plurality of candidate nodes of nodes functioning as the alternate path end points and thus congestion caused by the acknowledgement messages. Under these circumstances, it takes a large amount of time to establish alternate paths.

With the above facts in mind, according to the second preferred embodiment of the present invention, only one end point is determined for each of the groups, and the alternate path is determined when the restoration message arrives at each end point. The format of the restoration message is the same as that of the aforementioned second variation of the first embodiment. It will be noted that the nodes written into the second field of the restoration message do not serve as the alternate path end points. Thus, the contents of the fourth and fifth fields related to the nodes in the second field are zero. A restoration message related to the case shown in FIG. 4 is as follows:
1) Node D
2) Node C
3) Node B, node X, node Y
4) 0, 2, 1, 1
5) 0, path 1, path 2, path 3, path 4.

FIG. 8B shows the above restoration message. Each of the end-point nodes (B, X and Y in this case) receives the restoration message, and sends out the acknowledgement message. Thereafter, each of the end-point nodes ignores all the restoration messages.

Figure 10:
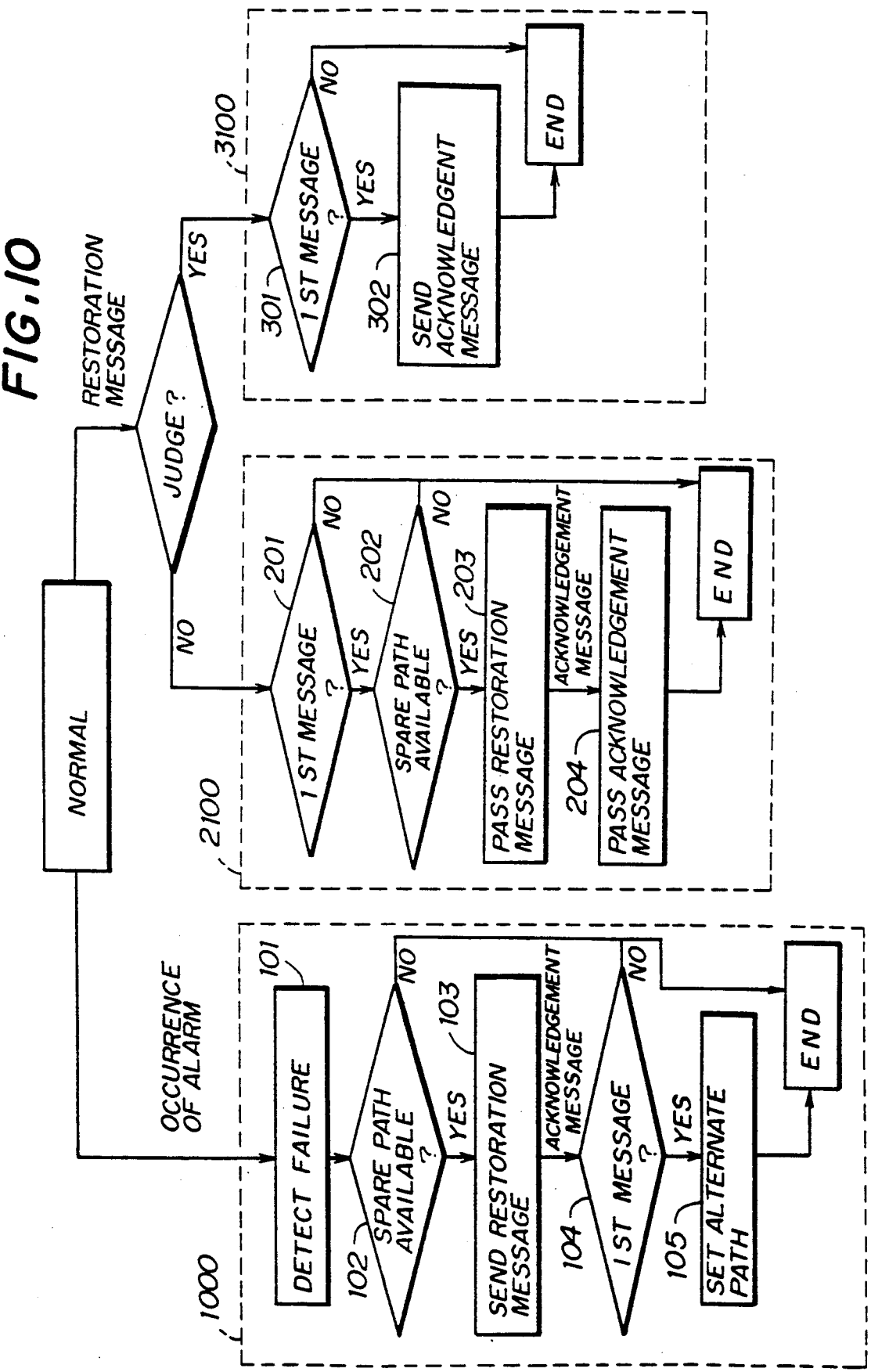
FIG. 10 is a flowchart illustrating the operation of the second embodiment of the present invention.

FIG. 10 is a flowchart illustrating the operation of the second embodiment of the present invention. In FIG. 10, those parts which are the same as those shown in FIG. 7A are given the same reference numerals. A procedure 2100 is substituted for the procedure 2000 (FIG. 7A), and a procedure 3100 is substituted for the procedure 3000. The procedure 2100 is obtained by placing step 201 before step 202 shown in FIG. 7A, and the procedure 3100 is obtained by placing step 301 before step 302. At step 201, each repeater node determines whether or not the received restoration message is the first received restoration message. When the result at step 201 is NO, each repeater node ends the procedure 2100. On the other hand, when the result at step 201 is YES, each repeater node executes step 202. At step 301 of the procedure 3100, the destination node determines whether or not the received restoration message is the first received restoration message. When the result at step 301 is NO, the destination node ends the procedure 3100. On the other hand, when the result at step 301 is YES, the end-point node executes step 302. It should be noted that according to the first embodiment of the present invention, step 190 determines the node C to be one of the candidate nodes of the alternate path end points, whereas according to the second embodiment, step 190 does not determine the node C to be one of the candidate nodes.

The second field of the restoration message used in the second embodiment is used for limiting the use of spare paths to a minimum number sufficient to form an alternate path to bypass the node or link having a failure. That is, in the case shown in FIG. 9, when the restoration message arrives at the node C, the restoration message is output to all the links except the link via which the restoration message has been transferred irrespective of whether or not all the links have spare paths. When the restoration message which has passed through the node C is received by the node D in advance of the other restoration messages, an alternate path is established between the node C and the node D, and the paths which were being used between the node B and the node C before the failure occurred are continuously used therebetween. Thus, the alternate paths 74 and 75 are formed.

A description will now be given of a third preferred embodiment of the present invention. It will be noted that the first and second embodiments are effective in a case where each link has a sufficient number of spare paths. The third embodiment of the present invention is effective in a case where the number of spare paths is not sufficient, as compared with the number of paths affected by the occurrence of a failure. The third embodiment effectively searches for alternate paths in the above case.

A single restoration message is used in the third embodiment and has information written into the sixth field thereof. The information in the sixth field of the restoration message indicates the number of restorable paths. The node which has detected a failure sends the restoration message having the sixth field in which a smaller one of either the total number of paths affected by the failure or the number of spare paths of each output link. Each of the repeater nodes compares the number written into the sixth field with the number of spare paths of each of its output links. When the number of spare paths is smaller than the number in the sixth field, the content of the sixth field is renewed by the number of spare paths. Further, the number of spare paths of the node being considered is provisionally subtracted from the number of spare paths written into the sixth field. For example, when the content of the sixth field is renewed, the number of spare paths of the node becomes zero after the restoration message having the renewed sixth field is sent out.

When the restoration message arrives at the destination node indicated therein, the destination node compares the corresponding number of alternate paths in the fourth field with the number of restorable paths in the sixth field. If the corresponding number of alternate paths in the fourth field is equal to or smaller than the number of restorable paths in the sixth field, all the alternate paths which have the node being considered as the end points thereof can be established. On the other hand, if the corresponding number of alternate paths in the fourth field is larger than the number of restorable paths in the sixth field, the node being considered writes the number of restorable paths in the sixth field into the acknowledgement message as the number of restorable paths affected by the failure, and sends back the same. Then, the node waits for another restoration message via another route. Until the total number of restorable paths regarding the node being considered becomes equal to or larger than the number of paths affected by the failure, the node successively receives the restoration messages.

During the above-mentioned procedure, it is possible for the destination node to accumulate the number of restorable paths each time the restoration message is received and to compare the accumulated number of restorable paths with the number of paths affected by the failure. Alternatively, it is also possible for the destination node to subtract the number of restorable paths from the number of paths affected by the failure each time the restoration message is received.

If one carrying out of the alternate path search procedure cannot establish alternate paths which avoid the paths affected by the failure, the above-mentioned procedure is repeatedly carried out. During the above procedure, spare paths which were provisionally used in the previous search procedure are handled so that they were not used except paths which were actually used.

Figure 11:
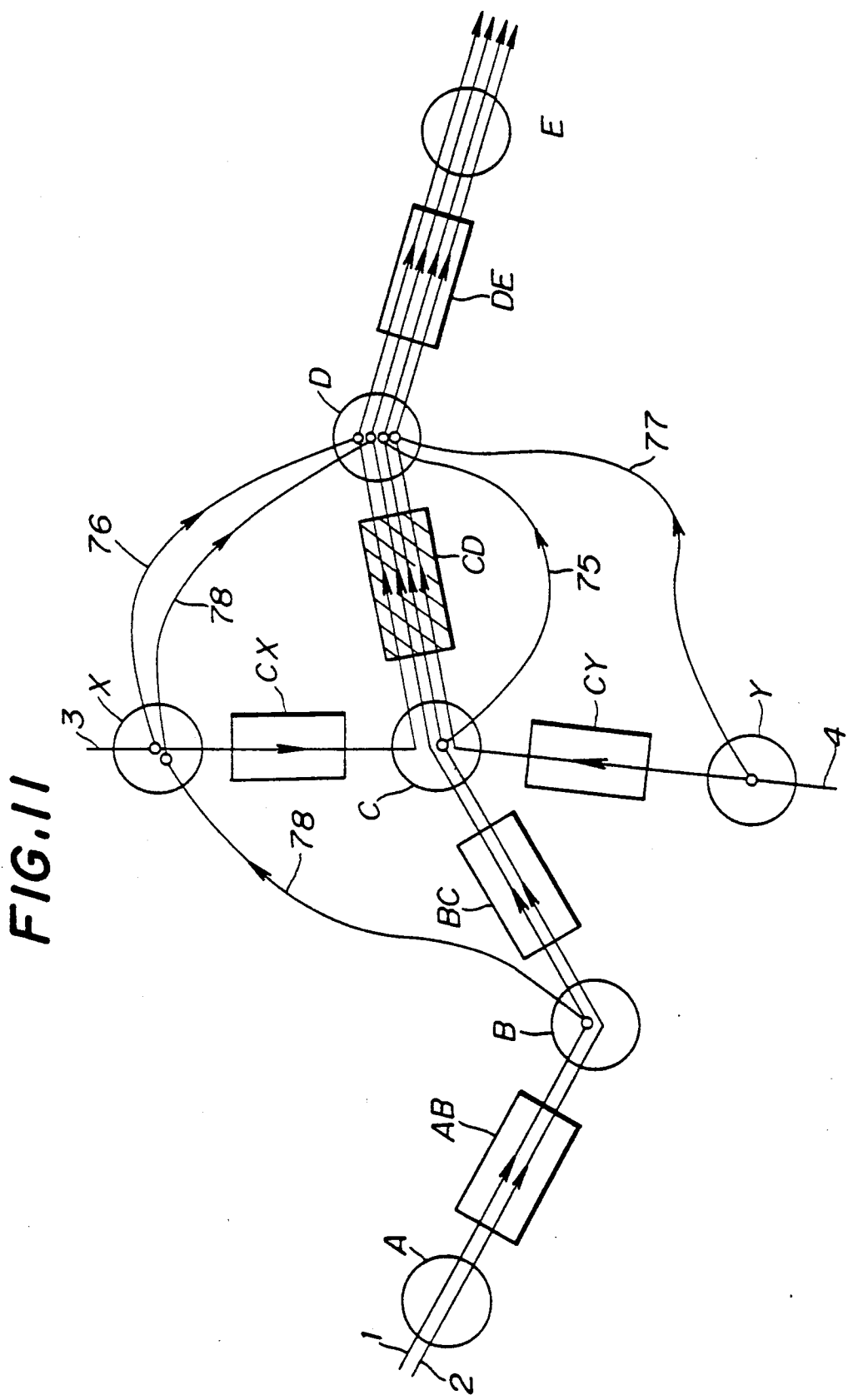
FIG. 11 is a block diagram illustrating how alternate paths are established according to the second embodiment of the present invention.

When the restoration message arrives at the destination terminal identified therein, if the number of restorable paths in the sixth field thereof is larger than the corresponding number in the fourth field, the restoration message is modified so that information about itself is removed from the restoration message. Then, a modified restoration message is sent out to output lines, each having a spare path. The use of such a modified restoration message enables the rest of the spare paths to be used as a part of another alternate path. For example, an alternate path 78 going through the node X shown in FIG. 11 is established by the modified restoration message.

Figure 12:
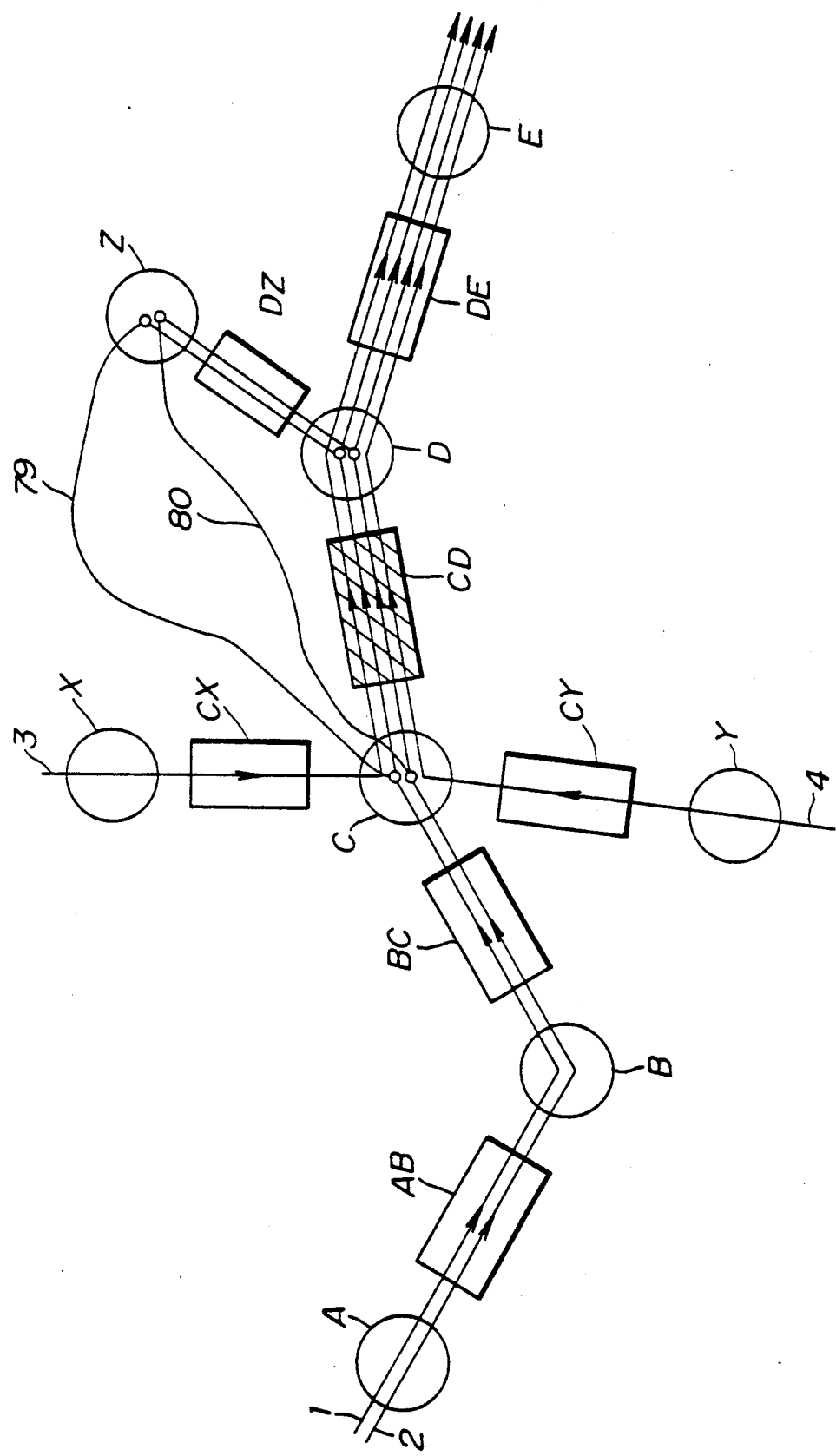
FIG. 12 is a block diagram illustrating how alternate paths are established according to a third preferred embodiment of the present invention.

There is a possibility that when the above-mentioned modified restoration message is used, paths 79 and 80 shown in FIG. 12 will be established. In this case, there is no problem if there are at least two spare paths in the link DZ between the node D and the node Z. On the other hand, if there is only one spare path in the link DZ, in actuality, two alternate paths are not available, nevertheless the above two paths are determined. In order to eliminate this problem, the node which corresponds to the start point of each possible alternate path adds a port identifier of an output link to the restoration message, and sends the restoration message with the port identifier. The destination node specified by the restoration message receives this message and stores the port identifier(s) included therein. When the destination node receives the next restoration message, it determines whether any of the port identifiers stored therein coincides with a port identifier included in the next restoration message. If the above determination result is affirmative, the next restoration message is ignored even if the total number of restorable paths has not yet become equal to the number of paths affected by the failure.

FIG. 13 is a flowchart of the above-mentioned procedure using the port identifier. In FIG. 13, those parts which are the same as those shown in FIG. 10 are given the same reference numerals. The node which corresponds to the start point of each alternate path executes a procedure 1100. At step 106 of the procedure 1l00, the node sends out the restoration message having the port identifier of the output link. Each destination node which is specified by the restoration message sent out at step 106 executes a procedure 3200. When the result at step 301 is NO, at step 303, the destination node determines whether or not the port identifier contained in the received restoration message does not coincide with any of the port identifiers stored therein, or determines whether or not the number of remaining paths stored therein is a value other than zero. If the result at step 303 is NO, the destination node ends the procedure. On the other hand, when the result at step 303 is YES, step 302 is executed. At step 302, the port identifier in the restoration message is stored in the destination node, and the number of remaining paths is renewed. At step 304 subsequent to step 302, it is determined whether or not a spare path is available. When the result at step 304 is NO, the destination node ends the procedure. On the other hand, when the result at step 304 is YES, the destination node sends out the modified restoration message.

FIG. 14 is a flowchart of a variation of the procedure shown in FIG. 13. In FIG. 14, those parts which are the same as those shown in FIG. 13 are given the same reference numerals. The node which corresponds to the alternate path start point executes a procedure 1200, in which step 107 is provided in addition to the procedure 1100 shown in FIG. 13. Step 107 is executed when it is determined, at step 104, that the received acknowledgement message is first received. At step 107, it is determined whether or not there is any path affected by the failure. When the result at step 105 is YES, step 105 is carried out. On the other hand, when the result at step 107 is NO, the node ends procedure 1200.

The present invention is not limited to the specifically disclosed embodiments, and variations and modifications may be made without departing from the scope of the present invention

What is claimed is:

1. A method for searching for an alternate path in a communication network which has a plurality of nodes and a plurality of links which mutually connect adjacent nodes, information being transferred via a path which goes through the nodes, said method comprising the steps of:

a) detecting a failure which occurs in the communication network;

b) identifying at most N nodes contained in each path affected by the occurrence of said failure and coupled to a sender node which detects said failure, each said path being connected to said sender node which detects said failure, said sender node serving as a start point of each alternate path which is to be established, where N is an integer equal to or greater than 2;

c) broadcasting a restoration message to links which extend from said sender node, said restoration message having an identifier of said sender node and identifiers of said N nodes specified for each said path affected by the occurrence of said failure, the identifiers of said N nodes specified for each said path being candidate nodes of an end point of each said alternate path;

d) determining whether or not a node which has received said restoration message is one of said candidate nodes, the node which is one of said candidate nodes and which has received said restoration message being a destination node;

e) passing said restoration message through a relay node which is one of the nodes other than said candidate nodes; and f) determining a route via which said restoration message has been transferred to said destination node to be an alternate path connected between said sender node and said destination node.

2. A method as claimed in claim 1, further comprising the steps of:

generating, at each node, a path tracer which stores the identifiers of at most said N nodes;

replacing the identifier of an oldest one of the nodes contained in said path tracer by its own identifier; and sending out said path tracer including its own said identifier to a next node located on a downstream side correspondign to a direction in which said path tracer is transferred.

3. A method as claimed in claim 2, further comprising the steps of:

receiving, for each said path, said path tracer from a neighboring node located on an apparatus side in said direction; and storing the identifiers of at most said N nodes included in said path tracer, wherein said N nodes contained in each said path affected by the occurrence of said failure are identified from the identifiers stored by said storing step.

4. A method as claimed in claim 1, further comprising the step of bundling paths respectively having an identical sequence of identifiers of the nodes os that a plurality of groups respectively having bundled paths are obtained, wherein said step (c) includes sending the restoration message having, as the candidate nodes, the identifiers of the N nodes included in each of the groups.

5. A method as claimed in claim 1, further comprising the steps of:

bundling paths respectively having an identical sequence of identifiers of the nodes so that a plurality of groups respectively having bundled paths are obtained; and selecting nodes included in at least one of the groups, wherein said step (c) includes sending the restoration message having, as the candidate nodes, the identifiers of the node selected.

6. A method as claimed in claim 1, further comprising the steps of:

sending back an acknowledgement message to said sender node from the destination node; and receiving, at said sender node, said acknowledgement message from the destination node, wherein said step (f) comprises the step of determining the route on the basis of said acknowledgement message received from the destination node.

7. A method as claimed in claim 1, wherein said step (f) comprises the step of switching, at each node between said sender node and the destination node, its matrix switch, so that said route is formed.

8. A method as claimed in claim 1, wherein said restoration message comprises information concerning the number of paths affected by the occurrence of said failure.

9. A method as claimed in claim 1, wherein said restoration message comprises information identifying each path affected by the occurrence of said failure.

10. A method as claimed in claim 1, further comprising the step of writing the identifier of said relay node into the restoration message when the restoration message is sent from the relay node.

11. A method as claimed in claim 1, further comprising the steps of:

deleting, at the destination node, one of the identifiers indicating said destination node from the restoration message; and broadcasting the restoration message with said one of the identifiers deleted therefrom.

12. A method as claimed in claim 1, further comprising the step of inserting at the sender node, a port identifier indicating a link which extends from the sender node, into the restoration message.

13. A method as claimed in claim 1, further comprising the step of bundling paths respectively having an identical sequence of identifiers of the nodes so that a plurality of groups respectively having bundled paths are obtained, wherein the restoration message comprises information about the identifier of one destination node defined for each of the groups.

14. A method as claimed in claim 5, further comprising the steps of:

sending back an acknowledgement message to said sender node from the destination node; and receiving, at said sender node, said acknowledgement message from the destination node, wherein said step (f) comprises the step of determining the route on the basis of said acknowledgement message received from the destination node.

15. a method as claimed in claim 14, further comprisign the steps of:

deleting, at the destination node, one of the identifiers indicating said destination node, from the restoration message; and broadcasting the restoration message with said one of the identifiers deleted therefrom.

16. A method as claimed in claim 15, further comprising the step of inserting, at the sender node, a port identifier indicating a link which extends from the sender node, into the restoration message.

17. A method as claimed in claim 14, further comprising the step of inserting, at the sender node, a port identifier indicating a link which extends from the sender node, into the restoration message.

18. A method as claimed in claim 14, wherein said step (f) comprises the step of determining, for each of the grups, an alternate path corresponding to a route related to said acknowledgement message which is first received by said sender node.

19. A method as claimed in claim 14, wherein said step of sending back the acknowledgement message comprises the step of sending back the acknowledgement message to said sender node from the destination node in response to the restoration message which is first received, the acknowledgement message not being sent back in response to restoration messages which are received after said restoration message is first received.

20. A method as claimed in claim 17, further comprising the steps of:
storing said port identifier of said restoration message which is first received into said destination node;
judging, at said destination node, whether or not the port identifier contained in the restoration message which is the second one received coincides with that stored in said destination node;
neglecting the restoration message when it is judged that the port identifier contained in the restoration message which is the second one received coincides with that stored in said destination node; and
sending ack the acknowledgement message to the sender node when it is judged that the port identifier contained in the restoration message which is the second one received does not coincide with that stored in the destination node.

21. A method as claimed in claim 20, further comprising the step of sending back no acknowledgement message to the sender node when it is judged that the port identifier cotnained in the restoration message which is the second one received, does not coincide with that stored in the destination node and when there is no path required to be restored.

22. A method as claimed in claim 12, further comprising the steps of:
storing said port identifier of said restoration message which is first received into said destination node;
judging, at said destination node, whether or not the port identifier contained in the restoration message which is the second one received coincides with that stored in said destination node;
neglecting the restoration message when it is judged that the port identifier contained in the restoration message which is the second one received coincides with that stored in said destination node; and
sending ack the acknowledgement message to the sender when it is judged that the port identifier contained in the restoration message which is the second one received does not coincide with that stored in the destination node.

23. A method as claimed in claim 22, further comprising the step of sending back no acknowledgement message to the sender node when it is judged that the port identifier contained in the restoration message which is the second one received doesn not coincide with that stored in the desitnation node and when there is no path required to be restored.

24. A method as claimed in claim 1, further comprising the steps of:
bundling paths respectively having an identical sequence of identifiers of the nodes so that a plurality of groups respectively having bundled paths are obtained; and
selecting nodes included in at least one of the groups, wherein said step (c) includes sending the restoration message having, as the candidate nodes, the identifiers of the node selected, said restoration message comprising information concerning the number of paths affected by the occurrence of said failure, information concerning an identifier of each path affected by the occurrence of said failure, and a port identifier indicating a link which extends from the sender node;
deleting, at the destination node, one of the identifiers indicating said destination node from the restoration message;
storing said port identifier of said restoration message which is first received into said destination node;
judging, at said destination node, whether or not the port identifier contained in the restoration message which is the second one received coincides with that stored in said destination node;
neglecting the restoration message when it is judged that the port identifier contained in the restoration message which is the second one received coincides with that stored in said destination node;
sending back the acknowledgement message to the sender node when it is jduged that the port identifier contained in the restoration message which is the second one received does not coincide with that stored in the destination node; and
receiving, at said sender node, said acknowledgement message from the destination node,
wherein:
said step (f) comprises the steps of determining the route on the basis of said acknowledgement message received from the destination node, and switching, at each node between said sender node and the destination node, its matrix switch so that said route is formed.

* * * * *

＃ UNITED STATES PATENT AND TRADEMARK OFFICE
CERTIFICATE OF CORRECTION

PATENT NO. : 5,218,601         Page 1 of 3
DATED : JUNE 8, 1993
INVENTOR(S) : TAKAFUMI CHUJO ET AL.

It is certified that error appears in the above-indentified patent and that said Letters Patent is hereby corrected as shown below:

TITLE PAGE [56] after line 3 of the FOREIGN PATENT DOCUMENTS, insert

--OTHER PUBLICATIONS

Nishimura, Yasuyo et al., "A Study on Autonomous Network Restoration Algorithms", IN89-70, NEC Corporation, pps. 7-12. (Abstract)

Grover, W.D., "A Fast Distributed Restoration Technique for Networks Using Digital Crossconnect Machines", IEEE GLOBAL COMMUNICATIONS CONFERENCE (Reprinted), Tokyo, Japan, November 1987, THE SELFHEALING NETWORK.

Yang, C. Han et al., "Fitness Failure Immunization Technology for Network Service Survivability", 1988 IEEE, pps. 1549-1554.--.

TITLE PAGE [57] ABSTRACT, line 1, "of a failure" should be --of a) detecting a failure--;
     line 15, "being" should be --are--;
     line 16, "als" should be --also--.

UNITED STATES PATENT AND TRADEMARK OFFICE
CERTIFICATE OF CORRECTION

PATENT NO. : 5,218,601
DATED : JUNE 8, 1993
INVENTOR(S) : TAKAFUMI CHUJO ET AL.

It is certified that error appears in the above-indentified patent and that said Letters Patent is hereby corrected as shown below:

Col. 2, line 68, "; second" should be --second--.

Col. 3, line 52, "aoknowledqement" should be --acknowledgement--;
line 64, "failure" should be --failure,--.

Col. 5, line 62, "oombinations" should be --combinations--.

Col. 7, line 32, "70 and 1" should be --70 and 71--.

Col. 9, line 20, "above 1) through 5)," should be --above items 1) through 5),--.

Col. 12, line 32, "1lo0," should be --1100,--.

Col. 13, line 49, "correspondign" should be --corresponding--;
line 63, "os" should be --so--.

Col. 14, line 62, "a method" should be --A method--.

UNITED STATES PATENT AND TRADEMARK OFFICE
CERTIFICATE OF CORRECTION

PATENT NO. : 5,218,601
DATED : JUNE 8, 1993
INVENTOR(S) : TAKAFUMI CHUJO ET AL.

It is certified that error appears in the above-indentified patent and that said Letters Patent is hereby corrected as shown below:

Col. 15, line 11, "grups," should be --groups,--;
        line 36, "ack" should be --back--.

Col. 16, line 3, "ack" should be --back--;
        line 12, "doesn not" should be --does not--;
        line 45, "jduged" should be --judged--.

Signed and Sealed this

Fifth Day of April, 1994

Attest:

BRUCE LEHMAN

*Attesting Officer*      *Commissioner of Patents and Trademarks*